Nov. 6, 1923.
W. J. O. JOHNSON
1,473,234
SAUSAGE LINKING MACHINE
Filed June 13, 1921  12 Sheets-Sheet 1
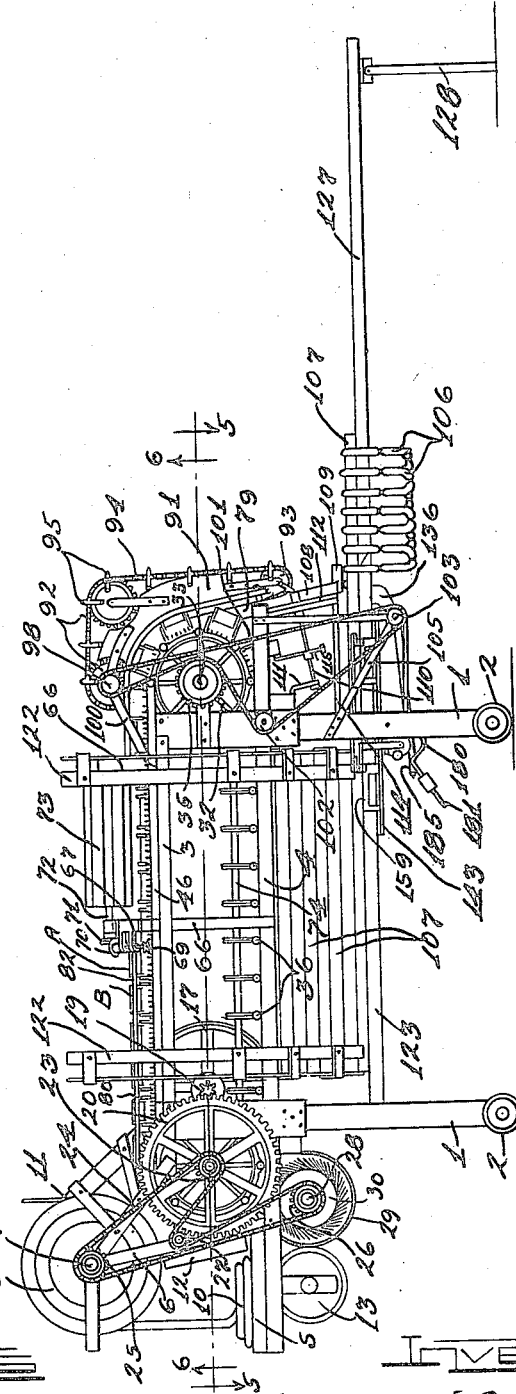

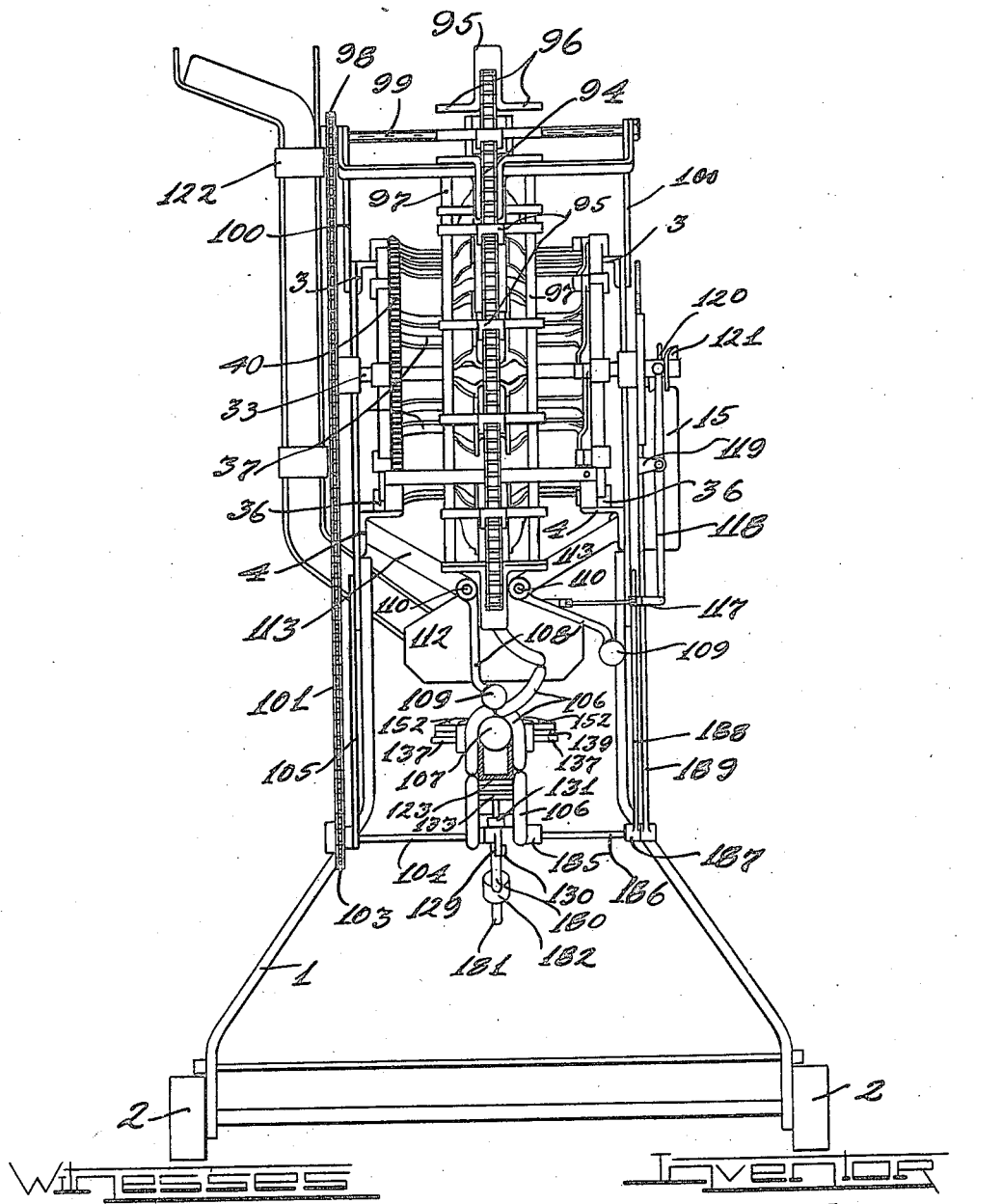

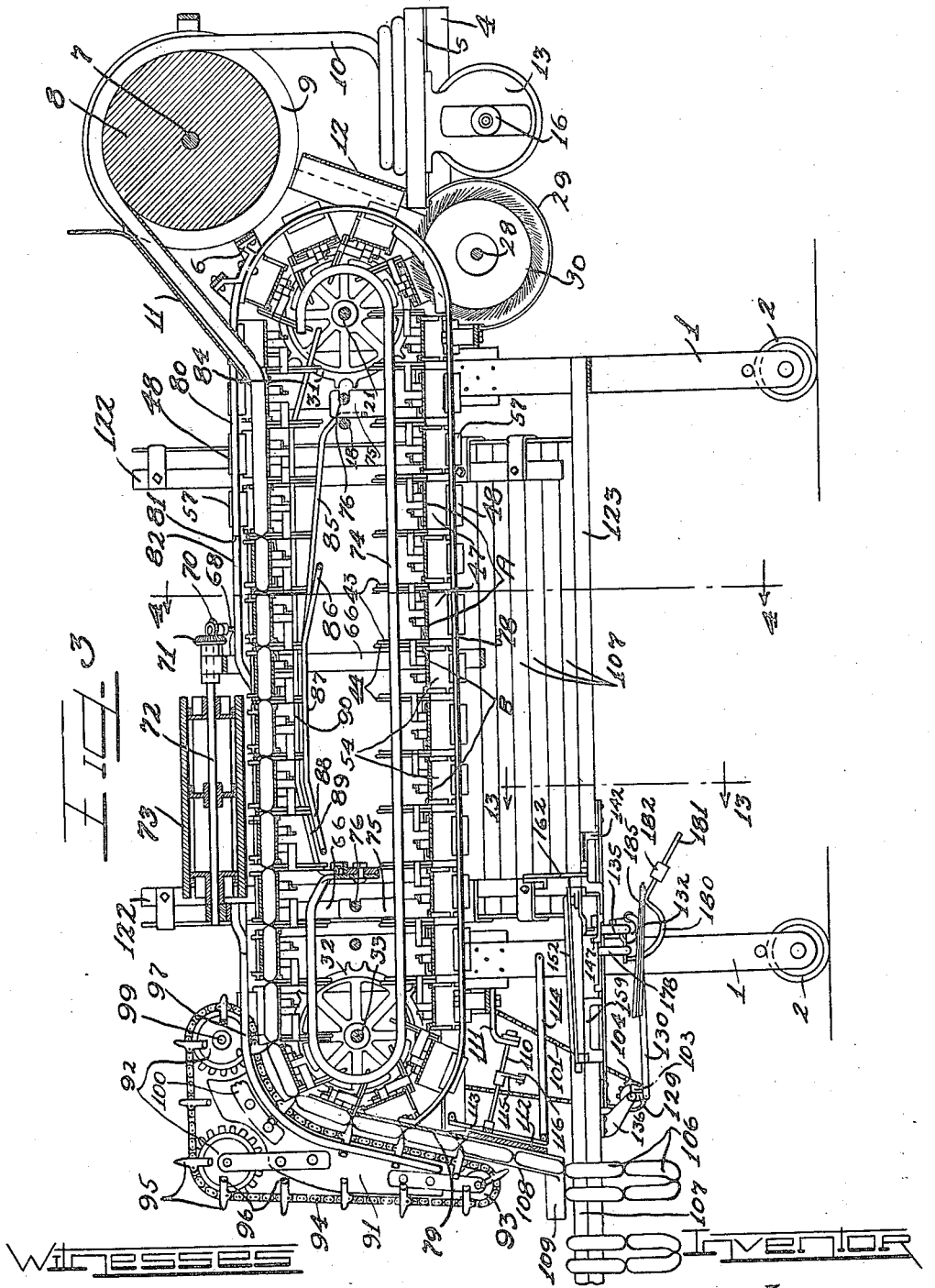

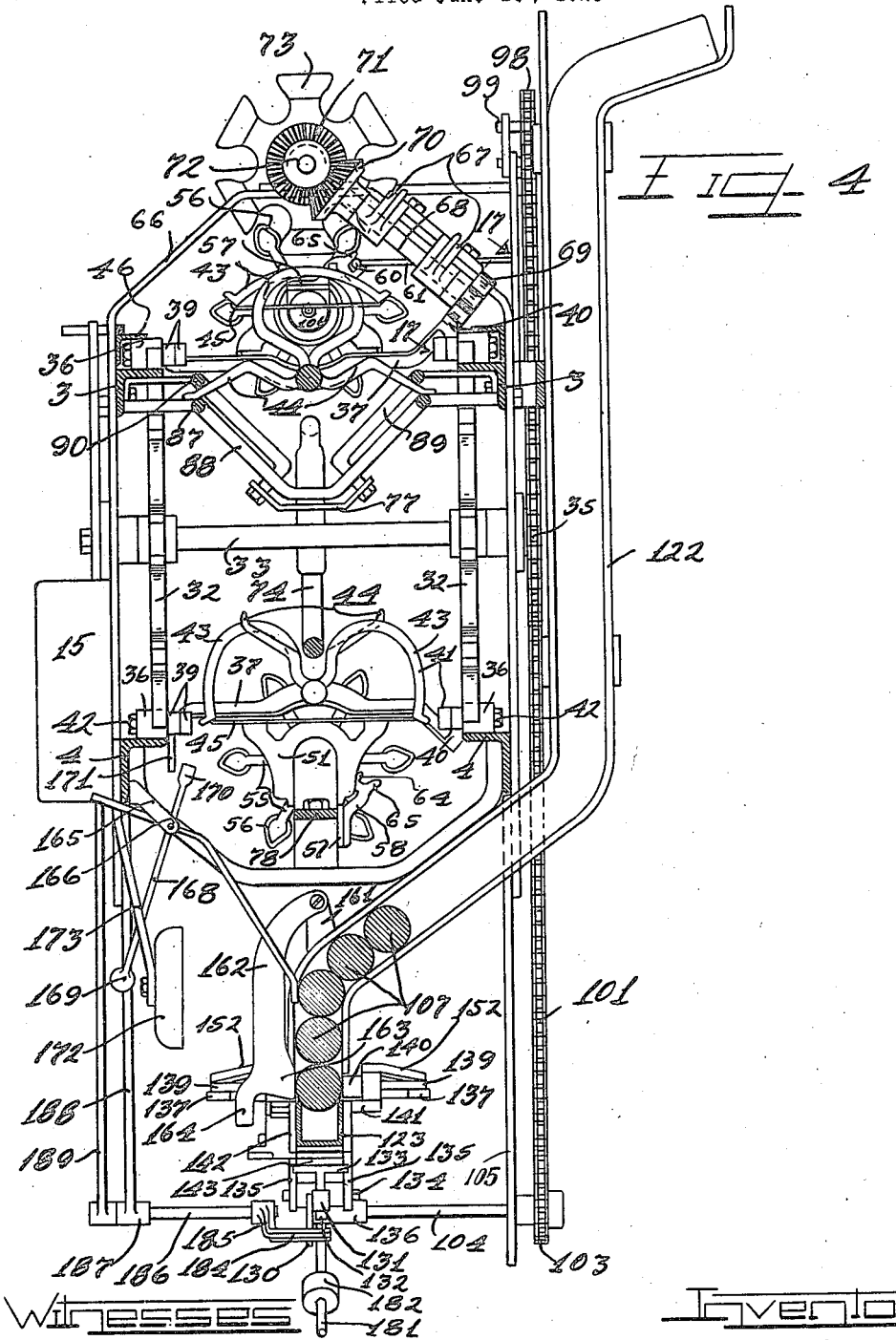

Nov. 6, 1923.                W. J. O. JOHNSON                1,473,234
                          SAUSAGE LINKING MACHINE
                          Filed June 13, 1921        12 Sheets-Sheet 5
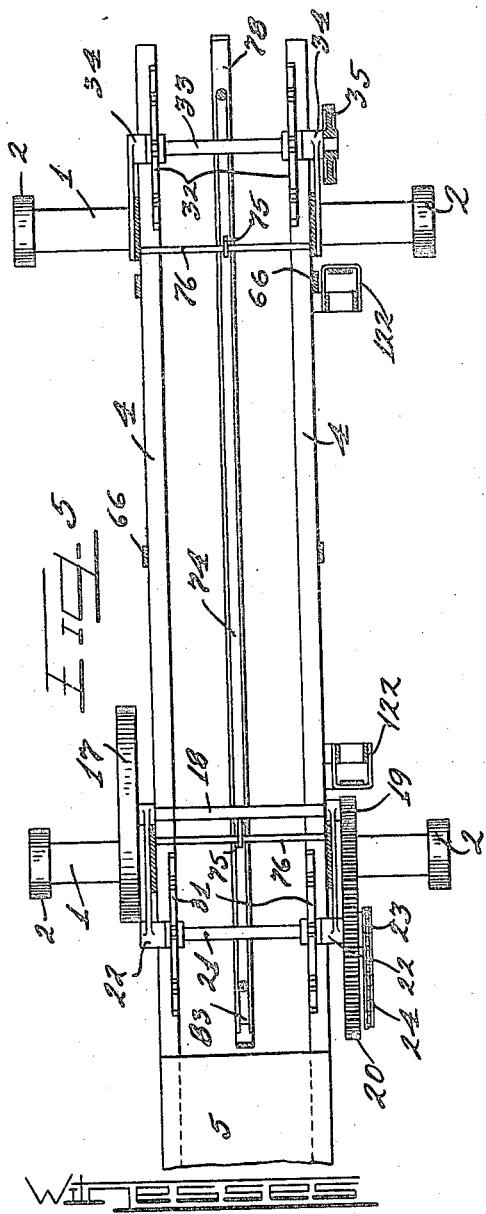
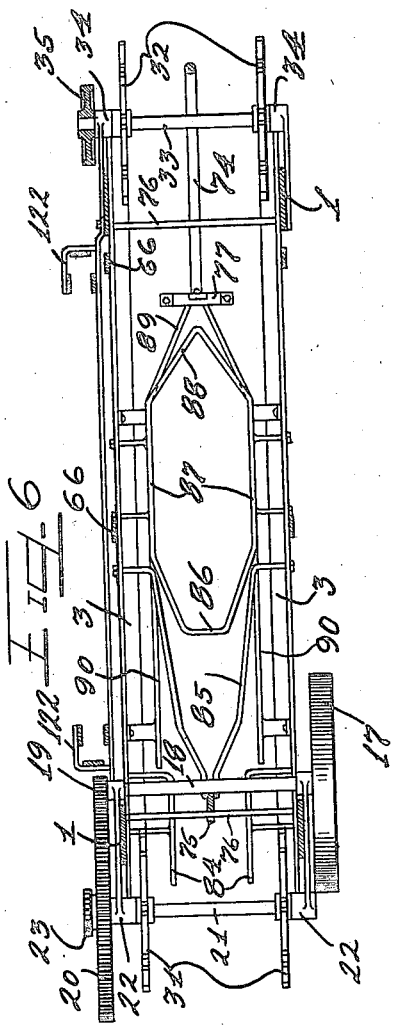

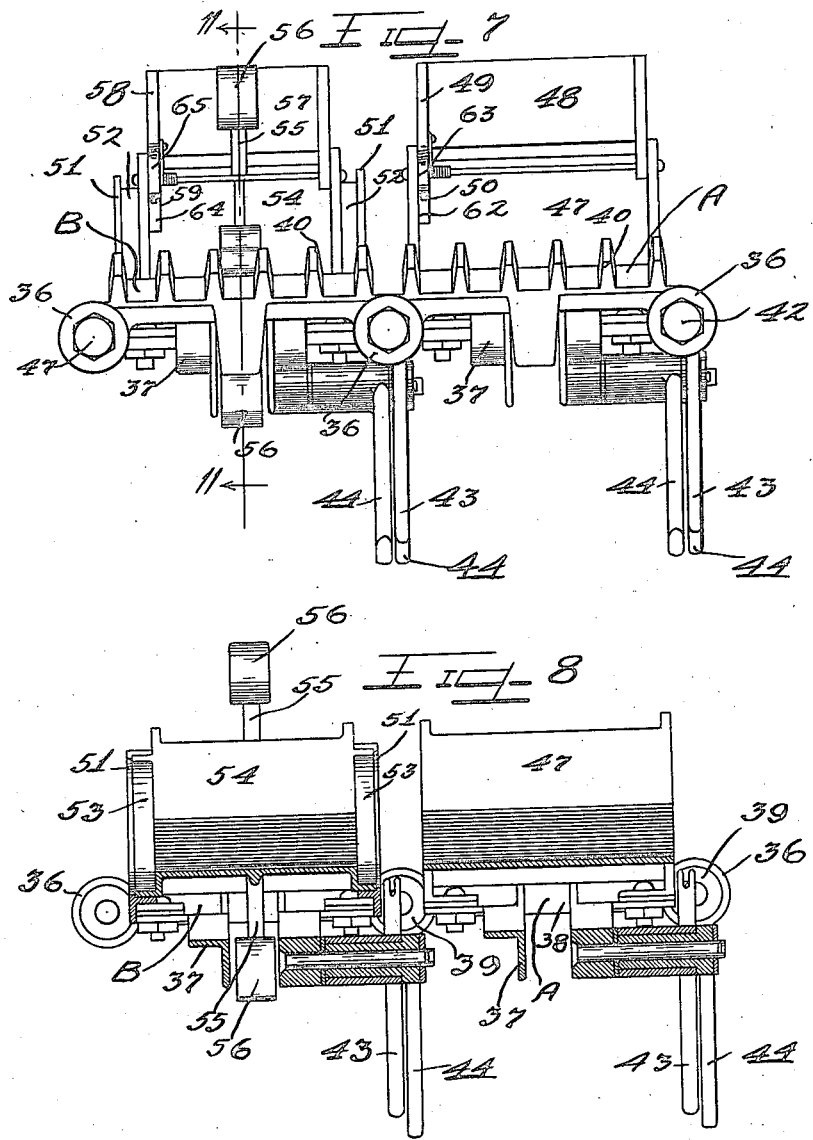

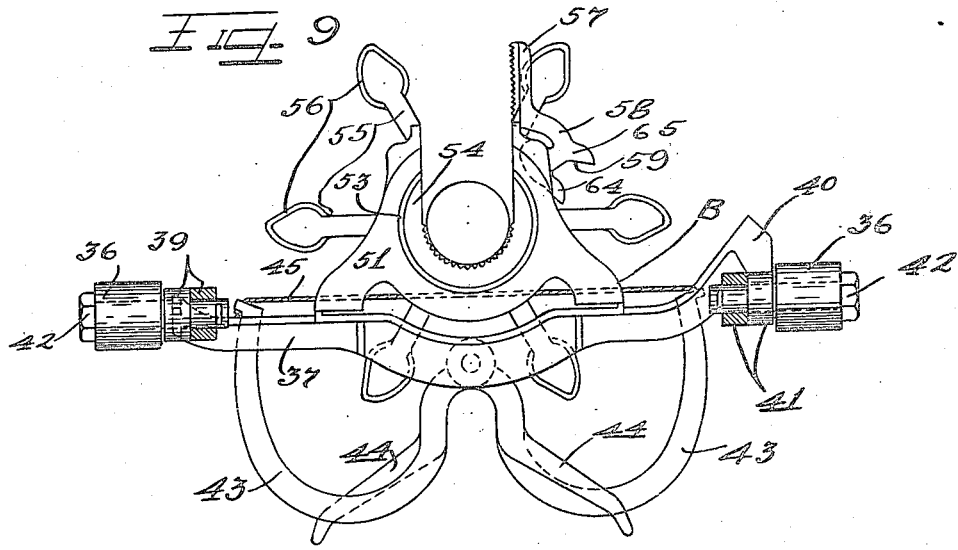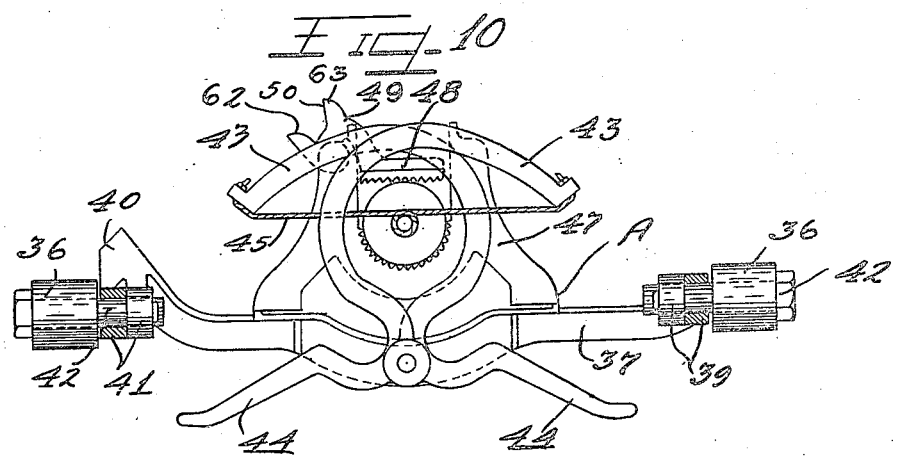

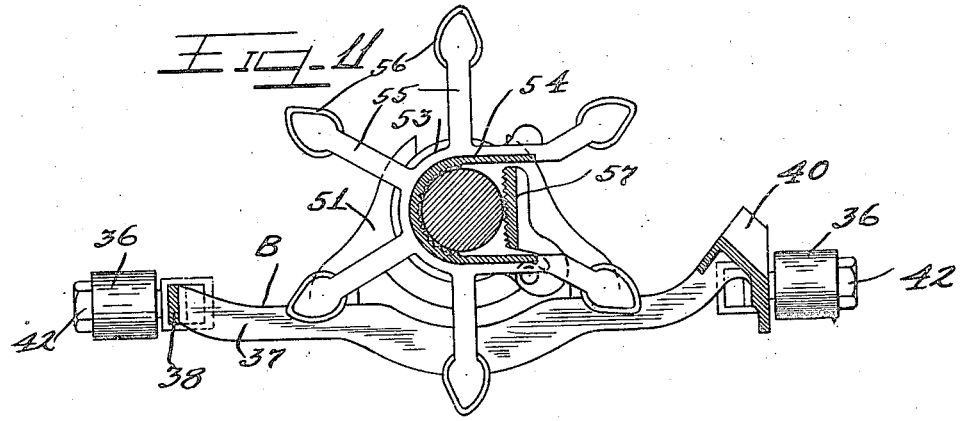
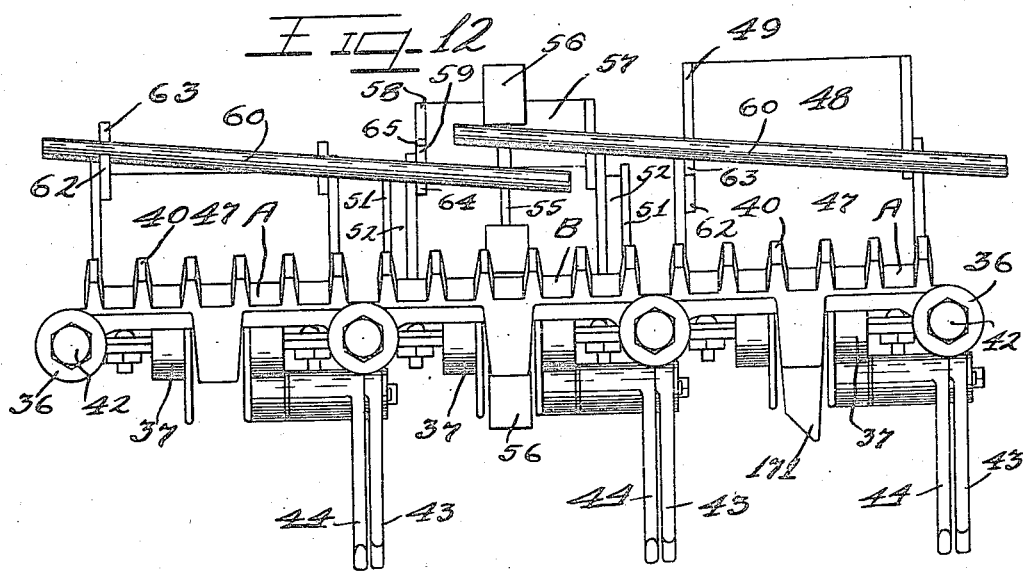

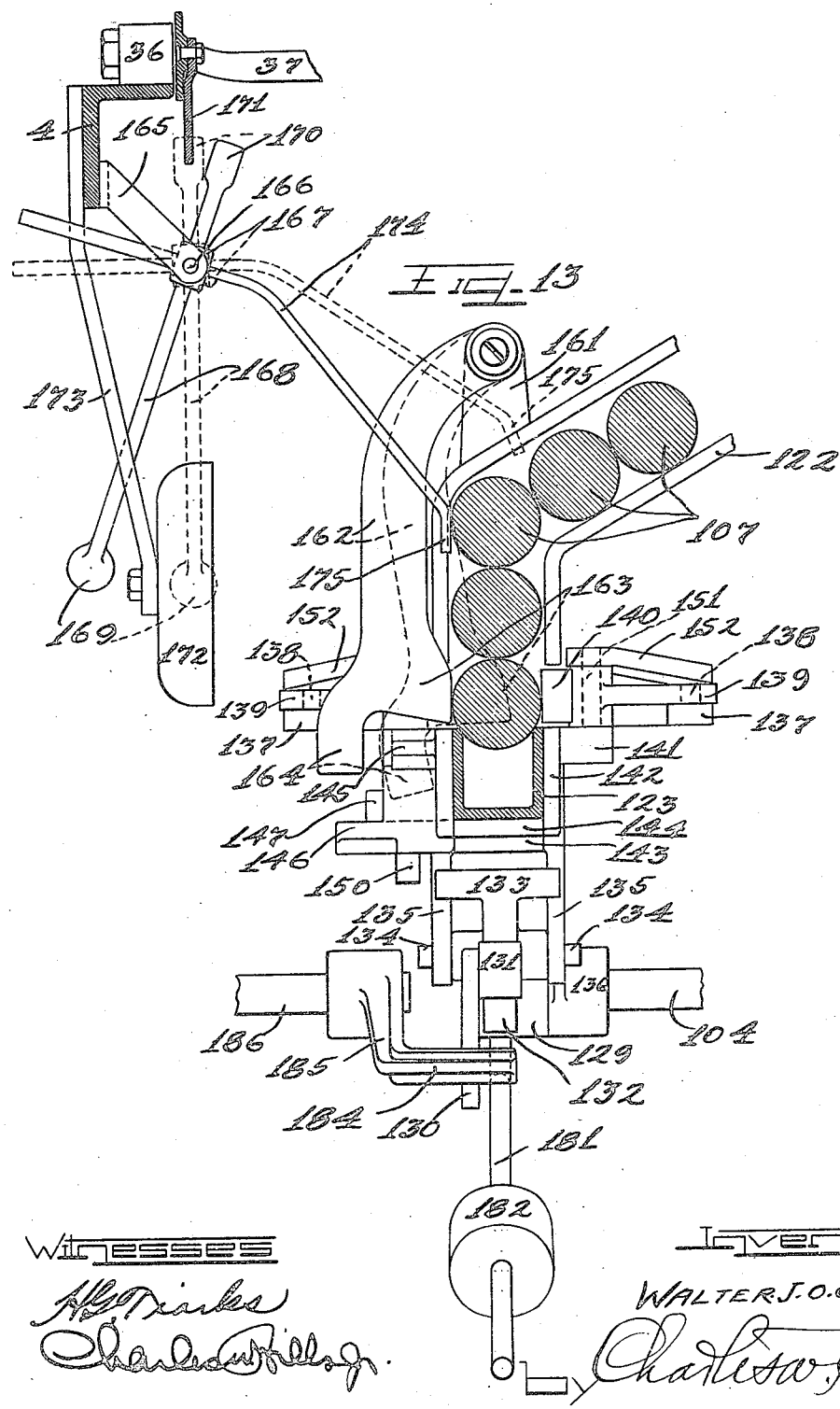

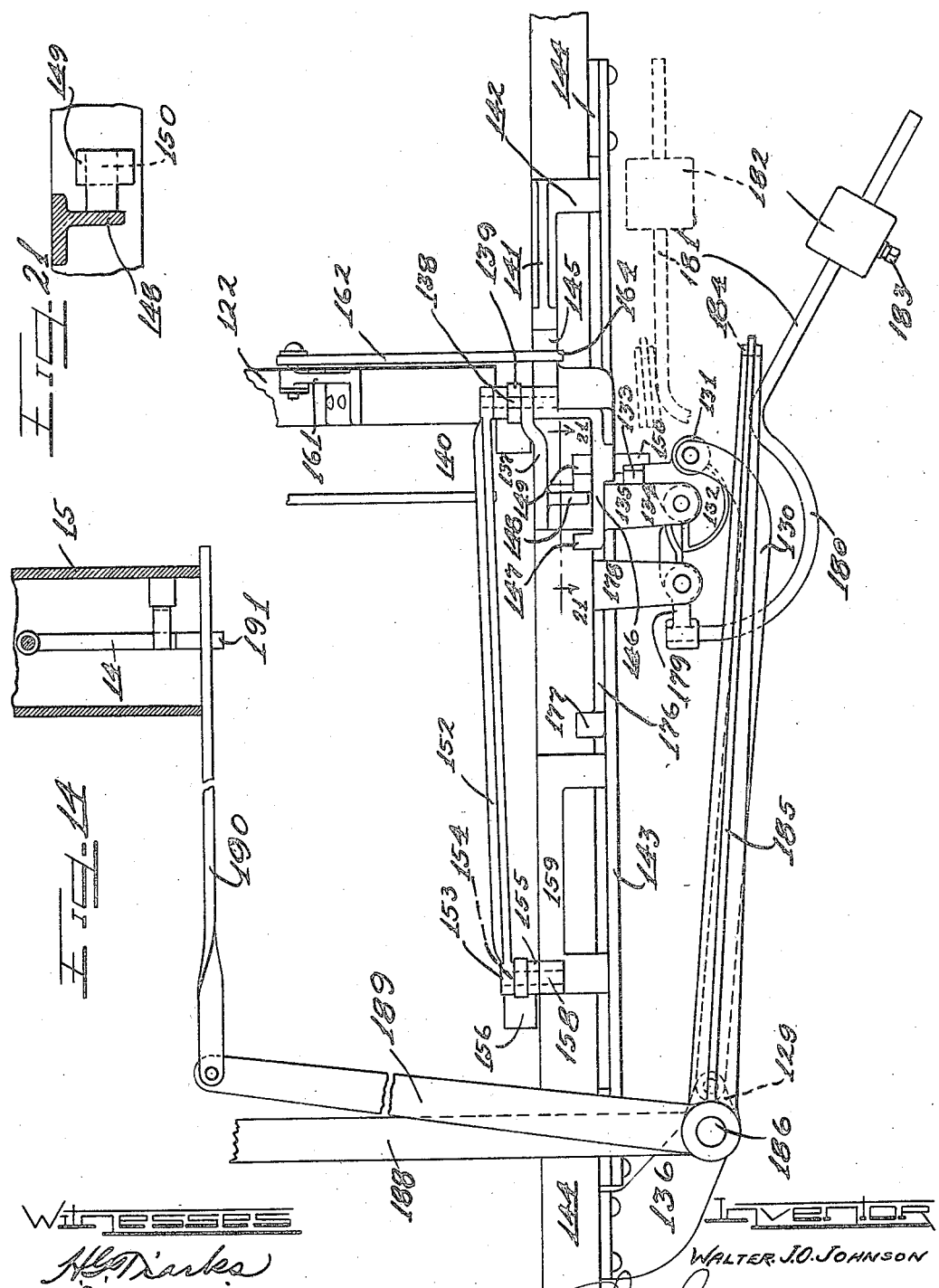

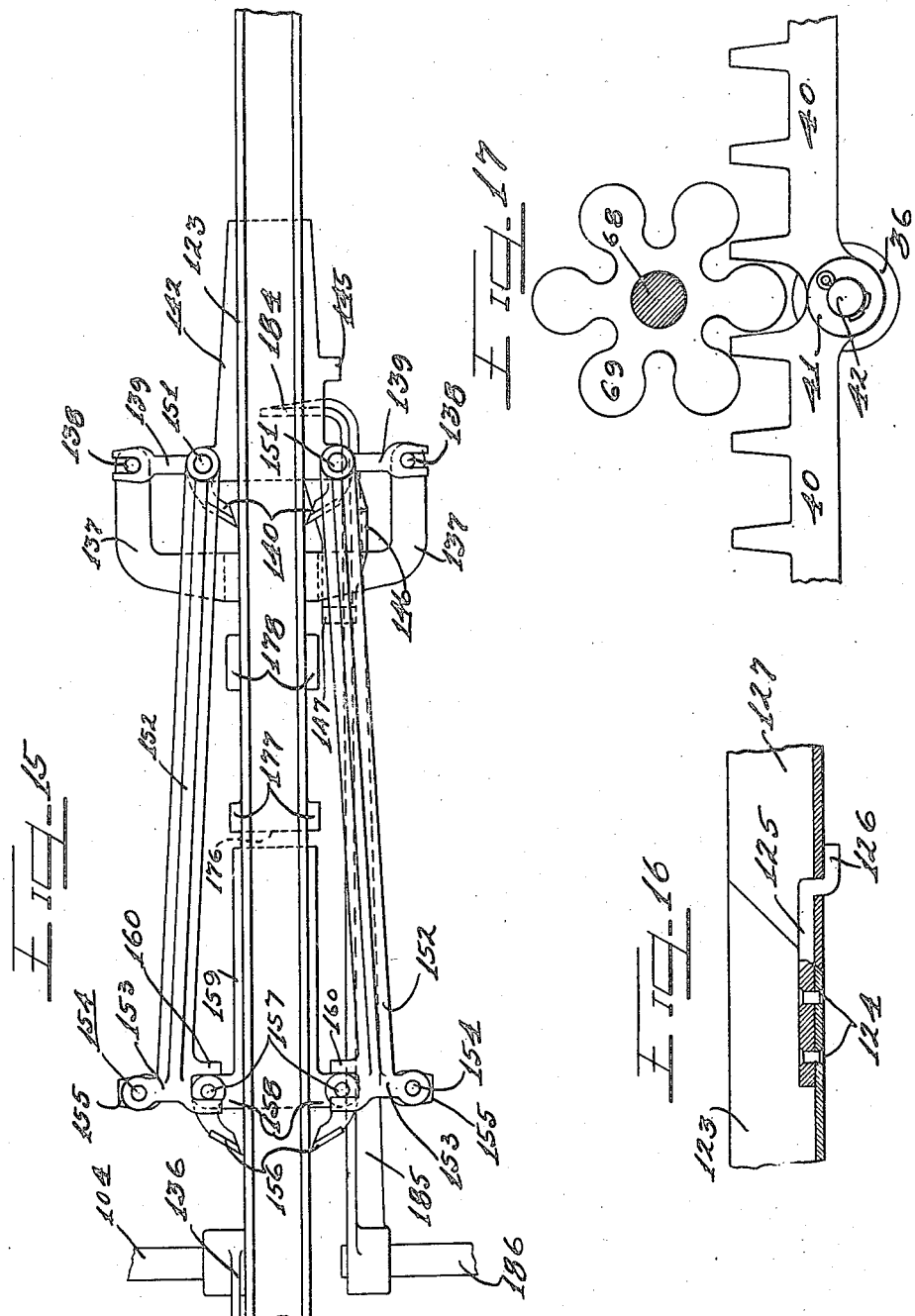

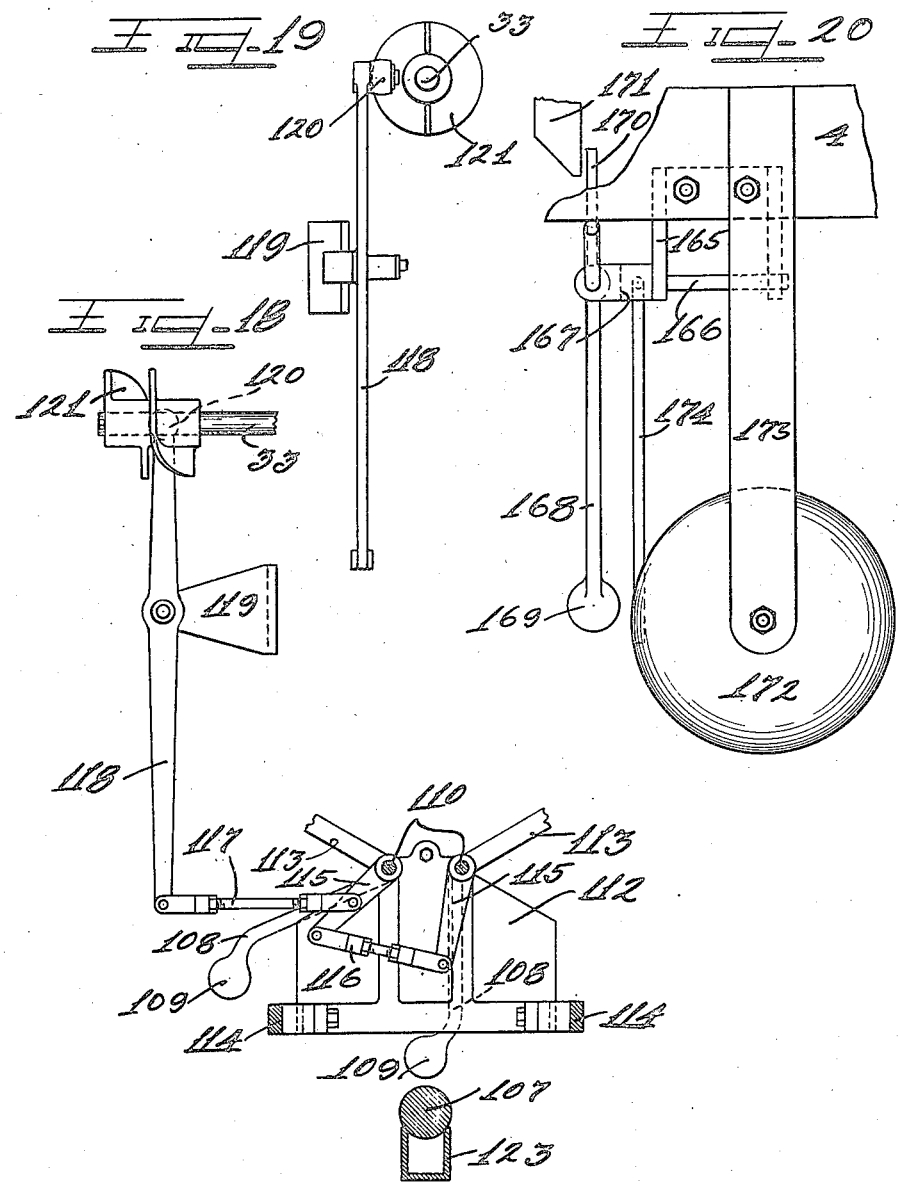

Patented Nov. 6, 1923.

1,473,234

UNITED STATES PATENT OFFICE.

WALTER J. O. JOHNSON, OF CHICAGO, ILLINOIS, ASSIGNOR TO THE ALLBRIGHT-NELL CO., A CORPORATION OF ILLINOIS.

SAUSAGE-LINKING MACHINE.

Application filed June 13, 1921. Serial No. 477,008.

*To all whom it may concern:*

Be it known that I, WALTER J. O. JOHNSON, a citizen of the United States, and a resident of the city of Chicago, in the county of Cook and State of Illinois, have invented certain new and useful Improvements in a Sausage-Linking Machine; and I do hereby declare that the following is a full, clear, and exact description of the same, reference being had to the accompanying drawings, and to the numerals of reference marked thereon, which form a part of this specification.

This invention relates more particularly to an improved type of a machine wherein intestines or long tubular casings which have been blown full of sausage meat are pulled into the machine by a rotating drum which feeds the filled casings into an endless conveyor constructed with means adapted to first temporarily wrap strings around the filled casing at equidistant intervals to form constricted portions, after which alternate units on the conveyor are rotated to cause twisting of the constricted portions of the casing to form links or chains of sausages from which the strings are removed as the sausages are run out of the machine controlled by means preventing the untwisting of the sausages which are looped over sticks automatically fed through the machine.

It is an object of this invention to provide a machine adapted to automatically form chains of sausages from filled casings fed through the machine.

It is also an object of the invention to provide a machine for the purpose of automatically twisting stuffed sausage casings to form chains of sausages of uniform size which are looped over sticks to permit the sausages to be removed supported on said sticks.

Another object of the invention is the construction of a machine wherein stuffed casings are twisted to form chains of sausages which are prevented from untwisting by mechanisms engaging the twisted portions of the sausages until the chains of sausages are looped over removable supports.

It is a further object of this invention to provide a machine for automatically forming sausages which are looped over sticks fed through the machine, which sticks control an audible signal provided for the purpose of notifying an attendant when the supply of sticks is running low.

It is furthermore an object of the invention to provide a sausage forming machine adapted to be automatically stopped when the supply of sticks on which the formed sausages are looped is exhausted.

It is an important object of this invention to provide a machine wherein an endless conveyor is furnished having alternate sections which are adapted to be rotated at predetermined times during the movement of the conveyor to cause portions of a stuffed casing carried by the conveyor to be turned with respect to other portions to cause the formation of links of sausages of uniform length.

Another object of the invention is the construction of a sausage linking machine having an endless conveyor for carrying a stuffed casing, said conveyor having cam controlled mechanisms thereon adapted to automatically cause strings to be temporarily engaged around portions of the casing to separate portions of the contents of the casing preparatory to a twisting operation of the casing to form a chain of sausages.

Still a further object of this invention is to provide a machine wherein a common driving mechanism is furnished for the purpose of simultaneously operating a plurality of devices whereby a stuffed casing is fed into the machine, twisted at intervals to form connected sausages, and then looped over sticks also fed through the machine into position to receive said sausages.

It is also an object of the invention to provide a machine adapted to act positively in twisting long filled casings to form links of sausages adapted to be hung in looped form over sticks fed through the machine and consecutively controlling the operation of an audible signal and an automatic stop mechanism to cause stopping of the machine when the supply of sticks is exhausted.

A further object of the invention is to provide a sausage linking machine wherein stuffed casings are stretched or tensioned as they are drawn upwardly over a feed wheel and are then pushed into the machine to release the tension to facilitate constriction of the stuffed casings at spaced intervals and twisting of the same to form links of sausages.

It is an important object of this invention to provide a sausage linking machine of positive and effective construction adapted to twist stuffed casings at intervals to form chains of sausages which are advanced through the machine and looped over sticks automatically fed into position to receive the linked sausages, said sticks acting as a medium for controlling a signal device and a switch mechanism governing the operation of the driving mechanism for the machine.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of the sausage linking machine embodying the principles of this invention.

Figure 2 is an enlarged elevation of the discharge end of the machine.

Figure 3 is a vertical longitudinal central section of the machine.

Figure 4 is an enlarged vertical section taken on line 4—4 of Figure 3.

Figure 5 is an enlarged horizontal sectional view taken on line 5—5 of Figure 1 with parts omitted.

Figure 6 is a sectional view taken on line 6—6 of Figure 1 with parts omitted to clearly disclose the cam mechanisms.

Figure 7 is an enlarged side elevation of one of the complete units forming the endless conveyor.

Figure 8 is a longitudinal section thereof.

Figure 9 is an enlarged detail end elevation of one of the conveyor sausage twisting units showing the constricting string held taut by the tongs in normal position.

Figure 10 is an enlarged detail end elevation of one of the sausage holding conveyor units showing the tongs crossed to loop the string around a sausage to constrict a portion thereof.

Figure 11 is a section taken on line 11—11 of Figure 7 showing the sausage twisting mechanism rotated through an angle of ninety degrees from the position shown in Figure 9.

Figure 12 is a detail side elevation of a section of the endless conveyor showing the rods controlling the shutters or doors for holding the sections of the stuffed casings in place to permit twisting of constricted portions.

Figure 13 is an enlarged detail sectional view taken on line 13—13 of Figure 3 illustrating the audible signal mechanism and part of the control mechanism governing the operation of the machine.

Figure 14 is an enlarged detail side elevation of the switch control mechanism and the apparatus for operating the same.

Figure 15 is a top plan view of the stick feeding mechanism.

Figure 16 is a fragmentary detail section through the joint of the stick feed channel.

Figure 17 is an enlarged detail view taken on line 17—17 of Figure 4 showing the means for driving the sausage twisting mechanisms.

Figure 18 is an enlarged sectional view partly broken away of the mechanism for looping the linked sausages over the receiving sticks.

Figure 19 is a view of the cam and fulcrum rod governing the operation of the sausage looping mechanism.

Figure 20 is an enlarged elevation of the audible signal mechanism.

Figure 21 is a detail section taken on line 21—21 of Figure 14.

As shown on the drawings:

The sausage linking machine comprises two end frame sections 1 supported on rollers or wheels 2. The end frame sections 1 are connected by means of upper angle sills 3 and lower angle sills 4. The lower sills 4 extend beyond the end frame sections and at the feeding end of the machine support a feed platform or table 5. Secured to the machine frame above the table 5 is an auxiliary frame 6 for supporting a rotatable axle or shaft 7. Rigidly secured on the middle portion of the shaft 7 is a feed wheel or drum 8 having a peripheral groove 9 wherein stuffed intestines or casings 10 are guided into a downwardly inclined guide chute or trough 11 into the machine. The guide chute 11 is supported on the auxiliary frame 6 and has the upper or receiving end positioned to project into the feed wheel groove 9 as illustrated in Figure 3. Supported on the auxiliary frame 6 below the feed wheel 8 is a shield or guard plate 12 to prevent the stuffed casings 10 on the table 5 from accidentally being caught in the operating mechanisms of the machine.

Rigidly mounted on the machine frame below the table 5 or in any other convenient place on said frame is an electric motor 13 adapted to be operated from any convenient source of electrical energy. The motor 13 is controlled by a single throw knife switch 14 shown in Figure 14 and supported in a box 15 on the discharge end of the machine frame. The switch is connected by suitable wires with the motor.

The motor shaft has a small driving pulley 16 secured on the projecting end thereof for driving an endless pulley or belt trained around a large fly-wheel or pulley 17. The pulley 17 is mounted on one end of a main shaft 18 supported transversely of the machine frame. A small drive pinion 19 is mounted on the other end of the shaft 18 and meshes with a large gear wheel 20. As illustrated in Figures 5 and 6, the large gear wheel 20 is supported on one end of a shaft 21 mounted transversely of the machine in journal bearings 22 supported on the machine frame. Mounted on the shaft 21 adjacent the outer side of the large gear wheel 20 is a pinion 23 for driving an endless chain 24. The chain 24 passes around a small gear or pinion 25 supported on the feed wheel shaft 7 to permit a drive to be transmitted to the feed wheel 8. The chain 24 also engages a pinion 26 and an idler pinion 27. The idler pinion 27 is supported on one side of the auxiliary frame 6. The pinion 26 is mounted on one end of a transverse shaft 28 supported beneath the frame sills 4 between the motor and one of the end frame sections 1. Secured on the middle portion of the shaft 28 within a shield or guard 29 is a circular brush 30 for cleaning a sausage conveyor hereinafter described.

Supported on the shaft 21 are two spaced driving sprocket wheels 31 which are disposed opposite sprocket wheel 32 supported at the other end of the machine frame on a shaft 33. The shaft 33 is journalled in bearing members 34 secured to the machine frame. A sprocket gear 35 is secured on one end of the shaft 33. The sprocket wheels 31 and 32 are provided with notched peripheral projections adapted to engage the rollers 36 of an endless conveyor or sausage carrier.

The endless conveyor is engaged on the sprocket wheels 31 and 32 and as illustrated in Figures 7 to 12 inclusive comprises a plurality of pivotally connected units A and B which alternate with one another. Each of the conveyor units A and B comprises a link 37 having integrally formed across one end thereof an end member or bar 38 provided with apertured heads 39 on the ends thereof. Integrally formed transversely of the other end of each link 37 is a rack 40 on the ends of which are integrally formed apertured heads 41. The heads 39 and 41 on each link are slightly offset to permit the heads of one link to be engaged adjacent the heads of another link to permit the shanks of connecting bolts 42 to be projected therethrough to pivotally connect the adjacent units A and B to form the endless conveyor. The rollers 36 are rotatably engaged on the connecting bolts 42 to the outside of the link heads 39 and 41 as shown in Figures 9 and 10. Pivotally mounted centrally on one side of each link 37 are a pair of tongs each member of which embraces a curved arm 43 and an integral handle 44 projecting in opposite directions from one another. The ends of the tong arms 43 are provided with slots or notches to receive the ends of constricting cords 45 which in normal position are drawn taut as shown in Figure 9. The rollers 36 of the upper lap of the conveyor are adapted to run on the horizontal flanges of the upper frame sills 3 beneath the flanges of angle guide rails 46 secured to the end frame 1 above the sills 3. The rollers of the lower lap of the conveyor are permitted to run on the horizontal flanges of the lower frame sills 4.

Rigidly mounted transversely upon the middle portion of each of the links 37 of the conveyor units A is a U-cross-sectioned trough or channel holder 47 open at both ends and having a spring controlled door or flap 48 pivotally mounted on one of the side walls thereof. Each door 48 is provided with a projection or handle 49 having a notch 50 therein.

Fastened transversely upon the middle of each of the links 37 of the conveyor units B are a pair of oppositely disposed journal brackets 51 having openings therein. Integrally formed on the inner side of each bracket 51 is a bearing ring 52 open at the top. Rotatably engaged in the bracket ring 52 are the supporting rings 53 of a U-shaped trough or channel shaped holder 54. The rings 53 have openings to register with the open channel holder. Integrally formed on each channel sausage holder 54 are a plurality of radially directed spokes or arms 55 each having a cam head 56 on the outer end thereof. The spokes 55 form a wheel which is permitted to rotate in a groove formed in each of the links 37. Each channel holder 54 has a spring controlled door or flap 57 pivoted on one side thereof and provided with a projection or handle 58 having a notch 59 therein. The inner surfaces of the doors 48 and 57 are knurled or ribbed as are also the inner surfaces of the channel holders 47 and 54.

For the purpose of opening the conveyor doors 48 and 57 before the discharging position of the machine is reached, a pair of inclined bars or rods 60 are supported on one side of the machine frame by brackets 61 shown in Figure 4. By referring to Figure 12 it will be noted that the rods 60 are inclined and parallel to one another, with the high end of one rod overlapping the lower end of the other rod. The notch 50 in each door handle 49 forms lower and upper teeth 62 and 63 respectively. The notch 59 in each door handle 58 affords lower and upper teeth 64 and 65 respectively. The teeth on the handle members are provided for the purpose of being successively engaged by the rods 60 to cause opening of the conveyor doors as illustrated in Figure 12.

Secured to the machine frame sills 3 and 4 are a pair of spaced arched supports 66 which engage over the endless sausage conveyor. Mounted on one of the arched supports 66 at one side of the machine are bearing members 67 in which an inclined shaft 68 is journalled. Secured on the lower end of the inclined shaft 68 is a pinion wheel 69 which is in mesh with the conveyor rack 40 to receive a drive therefrom to cause rotation of the shaft 68. Mounted on the upper end of the inclined shaft 68 is a beveled gear 70 which is in mesh with a beveled gear 71 supported on one end of a shaft 72. The shaft 72 is journalled in bearings on the arched supports 66 and is positioned longitudinally of the machine over the conveyor and in the plane thereof. Supported on the shaft 72 is a long drum gear 73 adapted when rotated to co-act with the rotatable conveyor unit wheels 55—56 to rotate the same and the sausage holders 54 to which they are secured.

Before portions of the sausage casing are turned to cause twisting of the constricted portions of the stuffed casing, the sausage casing constricting tong mechanisms which form a part of the endless sausage conveyor, are guided and operated by means of stationary guides and cam mechanisms supported on the machine frame within the contour of the conveyor. Referring to Figures 3, 4 and 6, the constricting tong guides and operating devices comprise a main tong guide rail or rod 74 disposed to the inside of the lower run of the conveyor and supported by notched brackets or hangers 75 which engage transverse rods 76 supported on the end frame sections 1. One end of the tong guide rail 74 is curled upwardly in a half circle at the loading end of the machine. The other end of said guide rail is curled upwardly and then extends inwardly and is fastened to a support 77. The guide rail 74 serves as a means for holding the tongs in a normal position similar to that illustrated in the lower portion of Figure 4 with the cords 45 held taut. The rail 74 is in engagement with the tongs as they leave the sausage turning position until the loading position of the conveyor sausage holders is reached and prevents rotation of the tong members.

Also secured on the machine frame is a door guide rail 78, one end of which is secured to the back of a sausage discharge chute 79 mounted at the unloading end of the machine. The other end of the door guide rail 78 at the loading end of the machine is curved upwardly and is secured to an upper door guide rail 80 which stops at a point 81 shown in Figure 3. The guide rails 78—80 also serve as a means for holding the rotatable sausage holders 54 of the conveyor from rotating. After passing the upper end 81 of the door guide rail 80 the springs of the doors act automatically to close the same. The rotatable conveyor sausage holders 54 however are prevented from rotating, after the spokes 55 pass the end 81 of the guide rail 80, by means of a guide rail 82 supported on the machine frame to the outside of the rail 80. The guide rail 82 extends to a point just outside of the field of operation of the gear drum 73. The guide rail 78 is cut away at 83 near the loading end of the machine to permit the cleaning brush 30 to project therethrough to engage in the sausage holders of the conveyor to permit cleaning of the same.

Attached to the frame sills 3 at the loading end of the machine are a pair of inclined parallel tong actuating rails 84 which start to act upon the pivoted tong handles 44 when they pass the upper end of the guide rail 74 at the loading end of the machine. The rails 84 being inclined serve to move the tong handles inwardly from the position shown in Figure 9 toward and past one another to cause crossing of the tong arms 43 and permitting the contracted pointed end of a stationary inclined diverging cam 85 to engage between the partly opened tong handles. The cam 85 diverges at its inner or upper end which is secured to the frame sills 3 as illustrated in Figure 6. From the cam 85 the handles 44 pass onto the tapered inclined end 86 of another cam member the middle members comprising two parallel rails 87 integral with the cam end 86. Integral with the opposite ends of the cam rails 87 is a downwardly inclined tapered tong handle release cam 88 which is disposed slightly below the downwardly inclined and converging cam ends 89 of two guide rods or rails 90 which are secured to the frame rails 3 and parallel thereto to serve as guides for the tong handles 44 to prevent return of the tong arms 43 from their constricting positions back into open position until the tongs come into engagement with the cam 89 which permit the tong arms 43 to move outwardly with respect to one another into release position. As shown in Figure 4, the ends of the tong handles 44 travel between the rails 90 and the cam 88 to permit opening up of the tongs to remove the constricting strings or cords from engagement with the constricted portions of the sausages carried by the endless conveyor.

Supported on the discharge end of the machine frame is an auxiliary conveyor frame 91 on which is rotatably supported a plurality of sprocket gears 92 and 93 around which an endless chain 94 is trained. Engaged on the chain 94 at spaced intervals are a plurality of projecting retaining fingers 95 having integrally formed on the inner ends thereof oppositely projecting guide arms or flanges 96. The fingers 95 are provided for the purpose of engaging the twisted portions of the linked sausages to prevent untwisting of the same after the constricting cords 45 have been removed. A pair of spaced guide ribs or rails 97 are supported on the discharge end of the machine frame on opposite sides of the chain 94 and afford a track for the flanges 96 of the fingers 95 during the time the fingers are in contact with the twisted portions of the sausages. A small sprocket gear 98 is mounted on one end of a shaft 99 which is supported on arms 100 secured to the machine frame and to the auxiliary frame 91. One of the sprocket gears 92 is also secured on the shaft 99. To drive the chain 94 an endless chain 101 engages around the small sprocket gear 98 and around one side of the sprocket gear 35 on the end of the shaft 33. The chain 101 also engages an idler sprocket gear 102 supported on the machine frame. The chain 101 operates a sprocket gear 103 supported on the outer end of a short shaft 104 supported near the outer end by a bracket 105 attached to the machine frame. A bracket 136 attached to the bottom of the stick guide channel 123 supports the inner end of the shaft 104.

The linked sausages are indicated by the reference numeral 106 and as they are discharged from the conveyor they pass through the discharge chute 79 to be looped upon bars or sticks 107 which are fed through the machine into a position to receive the sausages. The sausage looping mechanism is located at the discharge end of the machine below the sausage discharge chute 79 and comprises a pair of arms or pendulums 108 having outwardly directed fingers or heads 109 integral with the lower ends thereof. The pendulums 108 are secured on the rear or outer ends of a pair of parallel rotatable rods or shafts 110 which are supported in bearings provided by a bracket 111 and by an inclined apron or board 112. The apron 112 is supported below the sausage outlet chute 79 by means of inclined brace bars 113 and rods 114 which are attached to the machine frame. Keyed or otherwise secured to the shafts 110 behind the apron 112 are two downwardly directed arms 115 the lower ends of which are connected by means of an adjustable connecting link 116 to permit both shafts 110 to be rocked at the same time. Pivotally attached to one of the arms 115 is one end of an adjustable link 117 the other end of which is pivotally connected to the lower end of a fulcrumed lever 118. The lever 118 is fulcrumed intermediate its ends on a pivot pin on a bracket 119 secured to the machine frame below the shaft 33. The upper end of the fulcrumed lever 118 has a roller 120 mounted thereon for co-action with a double cam 121 secured on the shaft 33 to cause operation of said lever.

The sticks 107 are carried in a magazine secured to one side of the machine frame and comprising two guide channels 122 which extend inwardly beneath the conveyor and have the lower discharge ends thereof positioned directly above a stick guide channel 123. The stick guide channel 123 is supported longitudinally in the middle of the machine frame and extends rearwardly out of the machine. Rigidly secured to the outer inclined end of the stick guide channel 123 by rivets 124 or other suitable means is a projecting arm 125 having a hook member 126 integrally formed thereon. A stick guide channel extension 127 is provided and has the end nearest the machine inclined and apertured to permit the channel extension to be removably engaged on the hook 126 with the inclined ends of the channel sections abutting one another as illustrated in Figure 16. A leg 128 is pivoted beneath the outer end of the channel extension 127 to support the same in horizontal position in alignment with the channel 123.

The sticks 107 are permitted to drop by gravity one by one into the guide channel 123. A stick feed device is provided on the machine for the purpose of gradually feeding the sticks outwardly along the guide channel 123 and into the channel extension 127 into position to permit the linked sausages to be looped thereon. The stick feed device comprises an actuating eccentric or crank 129 secured on the inner end of the shaft 104. Pivoted to the eccentric 129 is the rear end of an actuating bar 130 the inner end of which is curved upwardly and is pivoted to a boss 131 forming an integral part of a pivoted dog 132. A T-arm 133 is integrally formed on the dog 132. The dog 132 is provided with integral lugs 134 which are journalled in a pair of brackets or arms 135. The arms 135 project upwardly on opposite sides of the channel 123 and have the upper ends thereof integrally connected to angle or yoke arms 137 which project outwardly and then forwardly toward the loading end of the machine. Pins 138 are secured on the angle arms 137 and are engaged by the notched arms 139 of the bell-crank members, the other arms of which form stick gripping claws or teeth 140. The bell-cranks 139—140 are pivotally mounted on pins or projections 141 which are integrally formed on opposite sides of a channel box 142 slidably engaged on the stick guide channel 123. The box 142 is supported on a guide bar 143 which is rigidly secured on the bottom of the stick guide channel 123 but spaced therefrom by spacer blocks 144. Integrally formed on one side of the box 142 is a projection or lug 145. Also integrally formed on the same side of the box 142 is a rearwardly directed bracket or extension 146 on the end of which an upwardly projecting stop 147 is formed. Integrally connected to one of the arms 135 and to one of said angle arms 137 is a projection or stop 148, which, as illustrated in Figure 14, is disposed between the stop 147 and a removable stick feed regulating member. The stick feed regulating member comprises a cross or block 149 having a plurality of arms disposed at right angles to one another and of different lengths as shown in Figure 21. A square stem 150 is integrally formed on the bottom of the cross 149 and removably projects downwardly through a square opening in the box extension 146.

Also attached to the pins 151 on the box projections 141 are the inner or forward ends of two long bars 152 having cross-arms 153 on the rear ends thereof. The cross-arms 153 are provided with downwardly projecting pins 154 which engage in the notched or forked arms 155 of bell-crank members, the other arms of which form gripping teeth or stick feed claws 156. The bell-cranks 155—156 are pivoted on pins 157 secured on projections 158 integrally formed on opposite sides of a channel box 159. The channel box 159 is slidably engaged on the stick guide channel 123 and is held in place by the guide bar 143. The inner ends of the bar cross-arms 153 are notched to form forks or yokes 160 to engage around the box pins 157 to permit the feed claws 156 to grip a stick before the box 159 is moved by the forked ends 160 of the bar cross-arms which act on the box pins 157 to cause movement of said box.

Rigidly secured to the stick guide channel 122 nearest the discharge end of the machine is a bracket 161 on which is pivoted the upper end of a gravity acting control arm 162 which controls the operation of the machine driving mechanisms and is itself governed by the sticks in the feed magazine. A projection or nose 163 is integrally formed near the lower end of the control arm 162 and normally contacts the lowermost stick in the magazine as illustrated in full lines in Figure 13. A tongue or finger 164 is also integrally formed on the lower end of the control arm 162 and is held out of contact with the lug 145 on the slide box 142 when sticks are held in the magazine. The control arm 162 is provided for the purpose of causing the automatic stopping of the machine when the supply of sticks 107 in the magazine has been exhausted.

Before the machine is automatically stopped an automatically operated audible signal mechanism is set in operation to advise an attendant that the supply of sticks in the magazine 122 is nearly exhausted. The audible signal mechanism is also governed by the sticks in the magazine 122 and is illustrated in detail in Figures 13 and 20. The audible signal mechanism comprises a two arm bracket 165 which is rigidly secured to one of the frame sills 4 and supports a pin or rod 166. Pivoted on one end of the rod 166 is a block 167 to one side of which is pivoted a bell striker or hammer arm 168 having a hammer head or ball 169 formed on the lower end thereof. The striker arm 168 is provided with an integral extension arm 170 which projects upwardly above the block 167 above the lower ends of a plurality of trip arms 171 which are carried at intervals on the endless sausage conveyor for the purpose of actuating or tripping the striker arm 168 at intervals to cause the hammer 169 to strike a bell or gong 172. The bell 172 is supported on a bracket 173 which is secured to one of the frame sills 4. To hold the bell striker arm 168 out of the path of the trip arms 171 a control bar 174 is secured to the block 167 at right angles to the striker arm 168. The control bar 174 is bent at an angle to permit the lower flange end 175 thereof to be contacted by one of the sticks 107 in the magazine 122. As shown in Figure 13, the third stick from the discharge end of the magazine is the one that engages the flange end 175 of the control bar 174 and holds the same in the full line position of Figure 13 thereby holding the striker arm 168 inclined and out of the plane of the bell 172 with the upper extension arm 170 swung to one side of the path of the trip arms 171.

When the supply of sticks 107 in the magazine 122 is such that there are only two sticks left in the magazine the audible signal is set in operation to notify an attendant that the supply of sticks in the magazine should be replenished. If the signal is not heeded or heard and the last stick drops from the magazine into the guide trough or channel 123, and is moved past the control arm 162, the control arm 162 moves inwardly into the dotted line position of Figure 13 to cause automatic operation of a machine stop or switch control mechanism which embraces a plate 176 which is held in place by the guide bar 143 below the guide channel 123 and between the slidable boxes 142 and 159. Lugs 177 are formed on opposite sides of the plate 176 to guide the same when moved. Also integrally formed on opposite sides of the plate 176 are two downwardly projecting arms 178 between the lower ends of which a trip arm 179 is pivoted. The trip arm 179 has one end engaging the pivoted dog 132 and the other end rigidly secured to one end of a curved arm 180. A straight arm 181 is integrally formed on the other end of the curved arm 180. A weight 182 is adjustably secured on the straight arm 181 by a set screw 183. The weight 182 normally acts to hold the trip arm 179 in a horizontal position to prevent pivoting of the dog 132.

Projecting across the weighted arm 181 is the bent end or head 184 which is integrally formed at right angles on the free end of a long lever 185. The lever is rigidly secured on the inner end of a short shaft 186 which is in alignment with the short shaft 104 and is journalled in a bearing 187 formed on the lower end of a supporting arm 188. The arm 188 is rigidly secured to the machine frame. Rigidly secured on the outer end of the shaft 186 to the outside of the arm 188 is an upwardly projecting lever 189 on the upper end of which one end of a switch control arm 190 is pivoted. The switch control arm 190 is provided with a slot or opening through which the handle 191 of a single throw knife switch 14 projects.

The operation is as follows:

The sausage casings 10 comprise cleaned entrails or intestines which are blown full of prepared sausage meat. The stuffed casings 10 are fastened to one another to form comparatively long lengths which are coiled for convenience of handling and deposited on the feed table or platform 5 below the feed drum 8. One end of a stuffed casing 10 is trained over the feed drum 8 and is fed downwardly through the inclined guide chute 11.

The machine is started by manually throwing in the control switch 14 which permits electric current to be furnished to the driving motor 13. The motor is illustrated as being mounted on the machine frame below the platform 5. It will, of course, be understood that the motor may be located in any other convenient location on the machine frame desired. The feeding platform 5 may if desired be omitted and a portable table or cart used beneath the feed drum 8 instead of said platform.

The motor 13 is connected by means of a belt with the fly-wheel 17 and rotates the same thereby causing a drive to be transmitted to the main shaft 18 and the pinion 19. The pinion 19 is in mesh with the large gear wheel 20 and causes rotation of the conveyor driving shaft 21 and the pinion 23 mounted thereon. The pinion 23 operates the endless chain 24 thereby causing rotation of the pinions on gears 25 and 26. A drive is thus transmitted to the feed drum 8 and to the conveyor cleaning brush 30. Rotation of the feed drum causes the stuffed casing 10 to be drawn upwardly thereover and fed downwardly through the guide chute 11. Attention is called to the fact that as the feed drum pulls the stuffed casing 10 upwardly the weight of the sausage meat within the casing causes the casing to be stretched or tensioned. As the stuffed stretched casing passes downwardly through the guide chute 11 the tension on the casing 10 is released and the feed drum acts to push the stuffed casing together again thereby causing slack in the casing.

Simultaneous with the operation of the feed drum 8 the shaft 21 acts to rotate the conveyor drive sprocket wheels 31 which in turn engage the rollers 36 on the sausage conveyor. The conveyor is thus operated and causes rotation of the sprocket wheels 32 and the shaft 33 supporting the same. As the conveyor rotates the conveyor unit doors 48 and 57 which are spring impelled are held in open position as they approach the loading chute by means of the door guide rails 78 and 80 while the tong guide rail 74 serves to hold the conveyor tongs 43—44 in open normal position with the cords 45 drawn taut as shown in Figure 4. The guide rail 74 also prevents rotation of the tongs about their pivot points. As illustrated in Figures 1 and 3 the circular brush 30 is rotated by the chain 24 and the sprocket 26 and when rotating acts to sweep out or clean the open sausage holders 47 and 54 as they are moved into contact with said brush.

The stuffed casing 10 is fed downwardly through the guide chute 11 and into the open holders 47 and 54 as they pass below the lower end of said chute 11. After the holders 47 and 54 are filled they are moved toward the discharge end of the machine. As soon as the doors 48 and 57 pass beyond the end 81 of the upper guide rail 80 the springs of said doors act to swing the door inwardly into closed position to contact and hold the filled sausage casing in place to be operated on.

When the sausage constricting tongs 43—44 pass the upper end of the guide rail 74 at the loading end of the machine, the tong handles 44 of each pair of tongs pass into engagement with and beneath the lower ends of the primary tong actuating inclined rails 84. With the advance of the tongs over the inclined rails 84 the handles 44 are gradually swung inwardly toward one another from the position shown in Figure 9 into a position wherein the handles 44 cross each other to permit the tapered end of the inclined diverging stationary cam 85 to engage between said handles. As the handles are moved toward one another by the rails 84 the respective tong arms 43 are swung upwardly toward one another thereby slackening the cord 45 connecting the ends thereof. With the continued advance of the conveyor the tong handles 44 engage over the opposite sides of the inclined diverging cam 85 which causes the tong arms to be swung further and further apart as they approach the upper end of the diverging cam 85 and pass onto the tapered inclined cam end 86. As the tong handles 44 pass upwardly over the constricting cam 85 and are moved apart the respective tong arms 43 are gradually swung inwardly toward one another until the notched ends thereof pass one another thereby causing the ends of the constricting cord 45, attached to said arms, to cross one another and loop around the stuffed casing 10 between adjacent conveyor units A and B.

The cord 45 is thus looped around the stuffed casing 10 and is drawn tight to constrict the casing 10 as illustrated in Figure 10 wherein the tong arms 43 are shown in their extreme or constricting positions. As the conveyor moves along carrying the stuffed casing 10, said casing is positively constricted at equally spaced intervals. From the upper end of the cam 85 the spread tong handles 44 pass onto the inclined cam end 86 and are guided between the rails 90 and the parallel horizontal cam rail 87 into the field of operation of the sausage twisting mechanism.

The conveyor is provided with the rack 40 the teeth of which engage the arms or teeth of the pinion 69 and cause the same to rotate thereby transmitting a drive through the beveled gears 70 and 71 to the shaft 72 and the long drum gear 73 mounted thereon. During the time the conveyor units B are moved along through the path of the conveyor the wheel spokes 55 of the rotatable sausage holders 54 are prevented from rotating by the guide rail 78 and then by the guide rail 82 as shown in Figure 3. As the conveyor sausage carrying units pass the rear end of the guide rail 82 they enter the field of operation of the drum gear 73 which rotates and engages the cam heads 56 of the spokes 55 thereby causing the sausage holders 54 and the sausage therein to rotate while the sausage holders 47 and the sausages therein are carried along without being rotated. Rotation of the portions of the stuffed casing in the holders 54 with respect to the alternate non-rotating portions of the casing in the holders 47 causes the constricted parts of the stuffed casing 10 to be twisted to form the linked sausages 106. After the twisting operation of the constricted parts of the stuffed casing 10 has been started the tong arms 44 pass from between the rails 90 and 87 between the downwardly inclined and tapered cam members 88 and 89. The cam members cause the tong handles 44 to gradually move inwardly toward one another. The arms 43 are moved outwardly and downwardly by the cam members 88 and 89 back into open or normal position, as shown in Figure 9. The return of the tong arms 43 to normal open position releases the constricting cord 45 from a twisted portion of the sausage casing. From the tong release cam members 88—89 the open tongs pass into engagement with the upturned rear end of the guide rail 74. The spokes 55 of the sausage holders 54 are brought into contact with the guide rail 78 and hold the sausage holders 54 against further rotation.

The sausages after being constricted and twisted as hereinbefore described are held within the respective conveyor sausage holders 47 and 54 by the spring impelled doors 48 and 57. To permit the linked sausages to be discharged from the conveyor the doors 48 and 57 are automatically opened against the action of their springs by the inclined door opening rods 60. As illustrated in Figure 12, the higher ends of the rods 60 are directed toward the loading end of the machine so that as the upper lap of the conveyor moves rearwardly the closed doors 48 and 57 approach the high ends of the rods 60. The upper end of the first rod first engages the lower teeth 62 and 64 respectively of the door handles 49 and 58, thereby causing the doors to be gradually opened. By the time the door handles reach the upper end of the second rod 60 the doors are partly opened thereby permitting the second rod to engage over the upper teeth 63 and 65 respectively of the doors 48 and 57. The second rod 60 causes the doors to open to their full extent. The conveyor doors 48 and 57 after being opened by the rods 60 are held opened by the chain 94 until they again reach the guide rail 78.

Upon reaching the discharge end of the machine the linked sausages 106 leave the open conveyor sausage holders 47 and 54 and pass through the discharge chute 79 and over the outer inclined surface of the apron 112 into the field of operation of the transversely swinging pendulums 108. After leaving the sausage twisting mechanisms the sausages are prevented from untwisting in the open holders 47 and 54 and while passing through the discharge chute 79, by the spaced fingers 95 carried by the chain 94. The chain 94 is operated by the sprocket gear 35 and the shaft 33 as shown in Figure 1. The fingers 95 are spaced a predetermined distance apart to permit the ends thereof to engage against the twisted constricted portions connecting the sausages 106 to hold said sausages against untwisting.

As illustrated in Figure 2, the linked sausages 106 pass downwardly between the swinging pendulums and are alternately engaged first by one of said pendulums and then by the other. The pendulums 108 are actuated by the rocking rods 110 which in turn receive their drive from the connected arms 115. The arms 115 are swung back and forth by the adjustable link 117 and the fulcrumed lever 118 disclosed in Figure 18. The lever 118 has a roller 120 on the upper end thereof which is in engagement with the double cam 121. The shaft 33 rotates the cam 121 and thereby operates the lever 118 and the sausage looping mechanisms. The swing of the pendulums 108 is regulated to permit the discharged sausages to be alternately engaged by the pendulums and alternately looped on opposite sides of one of the outwardly moving sausage receiving sticks 107. The looping mechanisms as illustrated are set to cause four sausages 106 to form a loop. The looping mechanisms may of course be adjusted to cause the loop to contain any desired number of sausages.

The sticks 107 for receiving the linked sausages 106 are supplied from the stick holding magazine 122. The sticks 107 are fed into the upper open end of the magazine and drop by gravity one by one into the stick guide channel 123. When a stick drops into the guide channel 123 the rear end of said stick is positioned between the gripping claws 140 of the stick feed mechanism illustrated in detail in Figures 13, 14 and 15. The chain 101 is operated by the shaft 33 through the sprocket gear 35, and serves to rotate the sprocket 103 and the short shaft 104 on the inner end of which the eccentric 129 is secured. Rotation of the eccentric 129 by the shaft 104 causes the bar 130 to be alternately moved rearwardly and forwardly. Rearward movement of the bar 130 forces the dog 132 rearwardly thereby also moving the arms 135 and the yoke arms 137 rearwardly. The dog 132 is held against pivoting by the trip arm 179 and the weight 182 on the arm 181. The rearward movement of the yoke arms 137 causes the pins 138 thereon to swing the bell-crank arms 139 rearwardly about the pivot points 151 thereby causing the bell-crank claws 140 to move inwardly toward one another to grip opposite sides of the stick 107 disposed therebetween. The friction between the box 142 and the channel 123 is sufficient to permit the gripping claws 140 to be moved into gripping position before the box 142 is moved rearwardly on the channel 123. With the rearward movement of the box 142 and the bell-crank claws 140 the stick is moved rearwardly in the guide channel 123 toward the sausage receiving position.

Attached to the slidable box 142 are the front ends of the bars 152 the rear ends of which are provided with pins 154 which serve to throw the bell-crank arms 155 rearwardly thus moving the bell-crank gripping claws 156 inwardly toward one another to grip against opposite sides of a stick 107 being fed rearwardly in the guide channel 123. After the rear gripping claws have been actuated the forward prongs of the yokes 160 reach the pins 157 and cause the rear box 159 to slide rearwardly on the guide channel 123. The sticks 107 are thus intermittently fed rearwardly by the bell-crank gripping claws 140 and 156. Upon each forward movement of the bar 130 the gripping claws 140 and 156 are thrown into release positions and the stick feed mechanisms are moved forwardly into normal position for the next operation. The plate 176 and the arms 178 which support the trip arm 179 and the weighed arm 180—181, are moved with the stick feeding mechanisms.

The distance through which a stick is moved rearwardly by each operation of the stick feeding mechanism is controlled by means of the removable feed control block 149, illustrated in Figures 14 and 21. The squared stem 150 of the block 149 is removably engaged through an opening in the box extension bracket 146 thereby positioning one of the block arms in place to contact the projection 148 on one of the arms 135. The block arms are all of different lengths, any one of which may be positioned to engage the projection 148 to regulate the amount of feed of the sticks 107.

The sticks 107 are thus fed rearwardly in the guide channel 123 and the guide channel extension 127 beneath the sausage discharge chute to receive the linked sausages looped thereon. The spacing of the sausage loops on the sticks 107 is governed by the distance the sticks 107 are fed rearwardly. After a stick leaves the field of operation of the gripping claws 156 it is advanced rearwardly by the following stick. The channel extension 127 is removably engaged to the rear end of the channel 123 as illustrated in detail in Figure 16 and may be readily detached and the leg 128 folded into a position parallel thereto.

The audible signal mechanism shown in Figures 4 and 13 is provided for the purpose of advising an attendant that the supply of sticks 107 in the magazine is running low. The signal control bar 174 is held in the full line position of Figure 13 by the third stick from the discharge end of the magazine, said stick being positioned at the bend in the magazine. As each stick drops into the position at the lower bend in the stick magazine it engages the end 175 of the signal control bar 174 thereby preventing the bar from swinging upwardly. When the supply of sticks falls below the level of the end 175 of the bar 174 the weight of the striker 168—169 causes the control bar 174 to swing upwardly into the dotted line position of Figure 13 as the striker falls by gravity into the plane of the bell 172. The upper arm or extension 170 of the striker is thus positioned in the path of the conveyor trip arms 171. When a trip arm 171 reaches the striker extension 170 it trips the striker 168 thereby causing the hammer 169 to fall and strike the bell 172. Each trip arm 171 repeats the operation so that an attendant not at the machine is notified that the supply of sticks in the magazine 122 needs replenishing.

In case the audible warning given by the bell 172 is not heeded and the last stick 107 drops from the magazine into the guide channel 123 and moves beyond the control arm 162 the automatic stop mechanism is brought into operation. By referring to Figure 13 it will be noted that as the last stick is fed rearwardly and passes the control arm 162, said arm falls inwardly by gravity into the dotted line position wherein the finger 164 engages in back of the lug 145 on the slidable box 142. The box 142 is thus stopped from moving rearwardly by the arm 162. When this occurs the arm 130 acting on the dog 132 acts to pivot the same thereby tipping the pivoted arm 179 and moving the weight arm 180—181 upwardly from the full line position of Figure 14 into the dotted line position. As the arm 181 moves upwardly it engages the bent end 184 of the lever 185 thus raising said lever and partially rotating the short shaft 186. Rotation of the shaft 186 throws the lever 189 rearwardly thereby drawing the pivoted switch control arm 190 rearwardly to automatically open the motor control switch 14 in the switch box 15. The machine is thus automatically stopped when the supply of sticks is exhausted thereby preventing the linked sausages from being looped and accumulated on the guide channel 123.

When a stick 107 is loaded with sausages and reaches the end of the guide channel extension 127, shown in Figure 1, the chain of sausages is cut where it extends to the next stick. The loaded sticks are then lifted from the guide channel and are placed on suitable racks to be smoked or otherwise treated.

I am aware that numerous details of construction may be varied through a wide range without departing from the principles of this invention, and I therefore do not purpose limiting the patent granted otherwise than necessitated by the prior art.

I claim as my invention:—

1. A sausage linking machine comprising an endless conveyor, means for first tensioning and then pushing stuffed sausage casings into said conveyor, a mechanism for operating said conveyor and said feed means, and means on said conveyor for automatically constricting said stuffed casings at spaced intervals.

2. A sausage linking machine comprising a conveyor for carrying stuffed sausage casings, means for operating said conveyor, casing constricting mechanisms mounted on said conveyor, means for operating the same to cause the sausage casings to be constricted and twisted at intervals as they are carried along by the conveyor, and rotatable means operated by the operating means to engage the twisted portions of the sausage casings to hold the same against twisting.

3. A sausage linking machine comprising a conveyor for carrying stuffed sausage casings, means for operating the conveyor, tong mechanisms pivotally supported on said conveyor, constricting cords carried thereby, and stationary means adapted to actuate said tong mechanisms to cause said cords to engage around said casings to constrict the same.

4. A sausage linking machine comprising a frame, a sausage casing conveyor supported thereon, means for operating the conveyor, tong members pivotally mounted on said conveyor in pairs, cords connecting the tong members forming said pairs, and a plurality of mechanisms for successively actuating said tong members to cause the same to first loop said cords around said sausage casing and then tension said looped cords to constrict said sausage casing at intervals as the casing is carried along by said conveyor.

5. A sausage linking machine comprising a frame, a conveyor supported thereon for carrying a stuffed sausage casing, means for operating the conveyor, tong arms pivotally mounted on said conveyor, handles integral with said tong arms, a cord connecting the ends of said tong arms, a guide rail on said frame for normally holding said tong arms against rotation with the cord drawn taut, stationary cam means adapted to be engaged by said tong arm handles to cause the tong arms to swing inwardly to cross one another to first loop the cord around the stuffed sausage casing and then tension the looped cord to constrict the sausage casing, and stationary cam members on said frame to permit said tong arms to return to normal position to release the looped cord from the constricted sausage casing.

6. The combination with an endless sausage casing conveyor, of mechanisms thereon for automatically constricting and twisting a stuffed sausage casing to form linked sausages.

7. In a sausage linking machine the combination with a conveyor for carrying a stuffed sausage casing through the machine, of means supported on the conveyor for automatically constricting portions of the stuffed casing as it is carried through the machine, and means supported on the conveyor for automatically twisting the constricted portions of the stuffed casing to form a chain of sausages.

8. A sausage linking machine comprising a conveyor, a sausage casing feed device, a guide device from the feed device to said conveyor, and means for simultaneously operating said conveyor and said feed device, said feed device when operated acting to first cause tensioning of a stuffed sausage casing and then causing compression thereof as said sausage casing is fed into said conveyor.

9. A sausage linking machine comprising a frame, a rotatable sausage casing feed drum supported thereon, a guide chute leading from said feed drum, a conveyor on said frame below the guide chute, means for operating said feed drum and said conveyor, said feed drum adapted when operating to draw a stuffed sausage casing upwardly thereover to tension the same and then push the stuffed casing into the conveyor downwardly through said guide chute to release the tension on the casing, means on the conveyor and frame for automatically constricting said casing at intervals, and rotatable means on the conveyor and frame for automatically twisting the constricted portions of the casing to form a chain of sausages.

10. A sausage linking machine comprising a frame, a conveyor thereon, means for operating the conveyor, a feed device on said frame operated by said means to cause stuffed sausage casings to be fed into the conveyor, mechanisms on said conveyor and frame for constricting the sausage casing at intervals, rotatable mechanisms on said conveyor and on said frame for twisting the constricted portions of said casing to form a chain of sausages, and means mounted on said frame adapted to contact the twisted portions of the sausages to hold the same from untwisting.

11. A sausage linking machine comprising a frame, a driving mechanism thereon, a conveyor driven thereby, a plurality of sausage holders rigidly secured on said conveyor, a plurality of rotatable sausage holders mounted on the conveyor between said rigid sausage holders, constricting mechanisms supported on the conveyor between said rigid and rotatable sausage holders, means on said frame for operating said constricting mechanisms to cause a stuffed sausage casing carried by said holders to be constricted at intervals, and means on said frame operable by said conveyor to cause rotation of said rotatable sausage holders to twist the constricted portions of said sausage casing to form a chain of sausages.

12. A sausage linking machine comprising a frame, a driving mechanism thereon, a conveyor driven thereby, a plurality of sausage holders rigidly secured on said conveyor, a plurality of sausage holders rotatably supported on said conveyor between said rigid sausage holders, constricting mechanisms pivotally supported on the conveyor between said rigid and rotatable sausage holders, means rigidly secured on said frame for operating said pivoted constricting mechanisms to cause a stuffed sausage casing carried by said holders to be constricted at intervals, a rotatable member supported on said frame, gear mechanisms connected therewith, a rack on said conveyor for operating said gear mechanisms and said rotatable member to cause rotation of the rotatable sausage holders to twist the constricted portions of said sausage casing to form a chain of sausages.

13. A sausage linking machine comprising a frame, a driving mechanism thereon, a conveyor driven thereby, stationary and rotatable sausage holders on said conveyor, constricting mechanisms adjustably supported on said conveyor, means on said frame for operating said constricting mechanisms to cause a stuffed sausage casing carried by said holders to be constricted at intervals, projections on said rotatable sausage holders, a rotatable member supported on said frame, gear mechanisms connected therewith, rack members formed on said conveyor for operating said gear mechanisms and said rotatable member to cause the rotatable member to rotate the rotatable sausage holders to twist the constricted portions of said sausage casing to form a chain of sausages, means on said frame for releasing the constricting mechanisms, and means supported on the frame and operable by said driving mechanism to engage the twisted portions of said linked sausages to hold the same against untwisting.

14. A sausage linking machine comprising a frame, a driving mechanism supported thereon, a conveyor on the frame comprising a plurality of pivotally connected links, rollers thereon, sprocket wheels on said frame driven by said driving mechanism to engage said rollers to operate the conveyor, stationary and rotatable sausage holders mounted on said links in alternating relation to carry a stuffed sausage casing, doors on said holders to hold the sausage casing in place in said holders, constricting mechanisms on said conveyor links, means on the machine frame for operating said constricting mechanisms to cause the sausage casing to be constricted at intervals, rack members on said conveyor links, means on said frame driven by said rack members to rotate the rotatable sausage holders to twist the constricted portions of said sausage casing to form a chain of sausages, means on the frame for releasing the constricting mechanisms, means mounted on the machine frame for opening the sausage holder doors after the twisting operation, and a mechanism on said frame operable by the driving mechanism adapted to engage the twisted portions of the sausages to hold the same from untwisting as the linked sausages are discharged from the machine.

15. In a sausage linking machine the combination with a conveyor, of means for driving the same, stationary and rotatable sausage holders on said conveyor for carrying a stuffed sausage casing, means for constricting the sausage casing at intervals, spokes radially formed on said rotatable sausage holders, a rotatable gear drum, and rack members formed on said conveyor to operate said gear drum to cause the same to engage said spokes to rotate the rotatable sausage holders to twist the constricted portions of the sausage casing to form a chain of sausages.

16. The combination with a sausage linking machine, of a conveyor unit comprising a link, guide rollers thereon, a rack integral with said link, a channel sausage holder rigidly secured on said link, a spring impelled door pivoted on said sausage holder, means on said door to permit opening thereof, a pair of tong members pivotally supported on said link, and a sausage constricting cord connecting said tong members.

17. The combination with a sausage linking machine, of a conveyor unit comprising a link, guide rollers thereon, a rack integrally formed on said link, brackets secured to said link, a channel sausage holder rotatably engaged in said brackets, spokes radially formed on said channel sausage holder, a spring impelled door pivoted on the sausage holder, means on the door to permit opening of the same, a pair of tong members pivoted on said link, and a sausage constricting cord connecting said tong members.

18. In a machine of the class described, the combination with an endless conveyor for carrying a stuffed sausage casing, of mechanisms on the conveyor for constricting the sausage casing and twisting the constricted portions, and means contacting the twisted portions to hold the same against untwisting.

19. In a machine of the class described, the combination with a conveyor for carrying a stuffed sausage casing, of a cord, and means on the conveyor for looping said cord around the sausage casing to constrict the same.

20. In a machine of the class described, the combination with an endless conveyor for carrying a stuffed sausage casing, of means carried by the conveyor adapted to be looped around the sausage casing and tensioned to constrict portions of the sausage casing as it is carried along by the conveyor.

21. In a machine of the class described, the combination with an endless conveyor for carrying a stuffed sausage casing, of stationary and rotatable mechanisms alternately supported on the conveyor for twisting portions of the sausage casing to form a link of sausages, and means on the conveyor between said stationary and rotatable mechanisms for constricting the sausage casing in advance of the twisting operation.

22. In a machine of the class described, the combination with a conveyor for carrying a stuffed sausage casing, of means coacting therewith for twisting portions of the sausage casing to form a link of sausages, and rack means on said conveyor for actuating said means.

23. In a machine of the class described, the combination with a frame, of a conveyor, holders thereon for carrying a stuffed sausage casing, doors on said holders, springs for holding the doors in contact with the sausage casing, notched arms on said doors, and members supported on said frame adapted to be engaged by said notched arms to cause opening of said doors.

24. In a sausage linking machine, the combination with a flexible endless conveyor for carrying a stuffed sausage casing, of constricting and twisting mechanisms on the conveyor, guide members for holding said constricting and twisting mechanisms from operating on the sausage casing, and stationary means for actuating the constricting and twisting mechanisms when the guide members are passed.

25. In a sausage linking machine, the combination with a conveyor, of stationary and rotatable holders thereon for carrying a stuffed sausage casing, means on the conveyor for constricting the sausage casing, a rotatable shaft, a drum gear mounted thereon, a bevel gear on one end of said shaft, a second shaft, a bevel gear on one end thereof meshing with the first bevel gear, a pinion wheel mounted on the other end of said second shaft, and a rack on said conveyor in mesh with said pinion wheel to cause rotation of said drum gear whereby the rotatable holders are rotated to twist the constricted portions of the sausage casing to form a chain of sausages.

26. A sausage linking machine comprising a frame, a conveyor thereon for carrying a stuffed sausage casing, a driving mechanism therefor, means on the frame and on the conveyor for constricting and twisting the sausage casing at intervals to form a chain of sausages, means on the frame adapted to engage the twisted portions of the sausages to prevent untwisting of the same, means on the frame for feeding sticks toward the discharge end of the machine, and means for looping the linked sausages on said sticks.

27. A sausage linking machine comprising a frame, a conveyor thereon, a driving means for operating the conveyor, holding members on said conveyor for carrying a stuffed sausage casing, constricting and twisting mechanisms on said frame and on said conveyor for automatically constricting and then twisting the sausage casing to form a chain of sausages, and a rotatable brush mechanism operable by said driving means to sweep out said holding members.

28. A sausage linking machine comprising a frame, a conveyor thereon for carrying a stuffed sausage casing, a driving means for operating the conveyor, means for constricting and twisting the sausage casing to form a chain of sausages, a plurality of sprocket gears supported on said frame adapted to receive a drive from said driving means, an endless chain driven by said sprocket gears, and projecting members on said chain adapted to engage against the twisted portions of the sausages to prevent untwisting thereof.

29. A sausage linking machine comprising a frame, a conveyor thereon for carrying a stuffed sausage casing, co-acting means on the conveyor and frame for constricting and twisting the sausage casing to form a chain of sausages, means contacting the sausages to hold the same from untwisting, a stick guide channel mounted on said frame, a stick magazine supported on the frame to deliver sticks to said guide channel, means for feeding said sticks along said guide channel, and means for looping the linked sausages on said sticks.

30. A sausage linking machine comprising a frame, a conveyor thereon for carrying a stuffed sausage casing, means on the conveyor and frame for constricting and twisting the sausage casing to form a chain of sausages, means preventing untwisting of the sausages, a discharge chute for the linked sausages, a stick guide channel, a magazine on said frame for supplying sticks to said guide channel by gravity, means for sliding the sticks rearwardly along the guide channel below the sausage discharge chute, a mechanism on said frame for automatically looping the linked sausages over the sticks as said sticks are advanced, and an audible signal mechanism controlled by said sticks adapted to operate when the supply of sticks in said magazine has fallen below a predetermined number.

31. A sausage linking machine comprising a frame, a conveyor thereon for carrying a stuffed sausage casing, a driving mechanism for operating the conveyor, a switch controlling the same, means on the conveyor and frame for automatically constricting and twisting the sausage casing to form a chain of sausages, a discharge chute through which the linked sausages are discharged, a stick guide channel on said frame, a stick magazine on said frame for carrying a supply of sticks to be fed into the guide channel, means for sliding the sticks outwardly in said guide channel below the discharge chute, means for loopng the linked sausages over the sticks as the sticks are advanced, an audible signal mechanism controlled by the sticks in said magazine and adapted to operate automatically when the supply of sticks in the magazine drops below a predetermined level, and means connected with said control switch to cause automatic opening thereof to stop the driving mechanism when the supply of sticks in the stick magazine is exhausted.

32. A sausage linking machine comprising a frame, a conveyor thereon, a drive mechanism therefor, a feed mechanism operable by said drive mechanism for feeding a stuffed sausage casing to said conveyor, a control switch for said drive mechanism, means for constricting and twisting the sausage casing as it is carried through the machine by the conveyor to form a chain of sausages, means for feeding sticks through the machine, a device for looping the discharged sausages over the moving sticks, a cam mechanism operable by the drive mechanism to operate the looping device, a signal controlled by the sticks in said magazine, means for operating the signal when the supply of sticks drops below a predetermined number, a switch operating mechanism connected with the control switch and with the stick feed means, and a gravity acting control member on the frame adapted to co-act with the stick feed means when the last stick is advanced to cause the switch operating mechanism to automatically open the switch to stop the machine.

33. A sausage linking machine comprising a stuffed sausage casing feed mechanism, a carrier for receiving the stuffed sausage casing to carry the same through the machine, a driving device for the carrier, means for automatically forming linked sausages from the stuffed sausage casing, slidable members operable from said driving device for receiving the linked sausages thereon, and control means for automatically stopping the driving device when the supply of said slidable members is exhausted.

34. A sausage linking machine comprising a carrier for carrying a stuffed sausage casing through the machine, a driving device for said carrier, means forming a chain of linked sausages from said stuffed sausage casing, members operable from the driving device for receiving the linked sausages, signal means adapted to be operated when the supply of said members runs low, and control means for stopping the driving device when the supply of said members is exhausted.

35. The combination with a machine for linking sausages, of a stick holding magazine, means for feeding the sticks into a position to have the linked sausages looped thereon, and a signal mechanism controlled by said sticks adapted to operate when the supply of sticks in the magazine has been reduced a predetermined amount.

36. The combination with a machine for linking sausages, of a stick holding device, means for feeding the sticks into position to receive the linked sausages, and a stop mechanism adapted to operate to stop the machine when the supply of sticks is exhausted.

37. The combination with a machine for automatically linking sausages, of means for feeding members into a position to receive the linked sausages, and signal and stop mechanisms controlled by said members.

38. The combination with a machine for linking sausages, means for feeding member into position to receive the sausages, a looping mechanism for looping the linked sausages on said members, a signal device adapted to operate automatically when the supply of said members reaches a predetermined number, and a stop mechanism adapted to automatically stop the machine when the supply of said members is exhausted.

39. The combination with a machine for forming linked sausages, of means for feeding sausage receiving members through the machine, means for automatically looping the linked sausages on said members, and signal means controlled by said members adapted to operate when the supply of said members is nearly exhausted.

40. The combination with a machine for linking sausages, of means for automatically looping the linked sausages on sticks as the linked sausages are discharged from the machine, and means controlled by the sticks for automatically stopping the machine when the supply of sticks is exhausted.

41. The combination with a machine for linking sausages, of a control switch mechanism for the machine, means for feeding sticks into position to receive the linked sausages, and means for automatically operating the control switch mechanism to stop the machine when the supply of said sticks is exhausted.

42. The combination with a machine for linking sausages, of means for feeding sticks into position to receive the sausages, and a plurality of control mechanisms governed by said sticks for automatically operating an audible signal and for stopping the machine.

43. The combination with a machine for linking sausages, of means for holding the sausages against untwisting as they are discharged from the machine.

44. In a sausage linking machine the combination with a sausage conveyor, of rotatable sausage holders thereon, means for cleaning the holders, and means for holding said holders against rotation when being cleaned.

45. In a sausage linking machine the combination with a conveyor, of sausage linking mechanisms co-acting therewith, means for feeding sticks into position to receive the linked sausages, a signal mechanism, an operating device for the signal mechanism adapted to be held in released position by the sticks, said operating device adapted to move into an operating position when the supply of sticks reaches a predetermined number, and trip members carried by the conveyor for actuating said operating device to cause operation of the signal mechanism.

46. The combination with a machine for linking sausages, of a guide channel, means for feeding sticks along said guide channel into position to receive the sausages looped thereon, and an extension for said guide channel removably attached to the outer end of said guide channel.

47. The combination with a machine for linking sausages, of a guide channel, means for feeding sticks along said guide channel into position to receive the linked sausages, a member secured to the outer end of said guide channel, a guide channel extension removably connected to said guide channel by said member, and collapsible means for supporting the outer end of said extension.

48. The combination with a machine for linking sausages, of a mechanism for feeding sticks into position to receive the linked sausages, and means for controlling the distance through which the sticks are advanced with each operation of said feed mechanism.

49. The combination with a machine for linking sausages, of a mechanism for feeding sticks into position to receive the linked sausages, and a removable stick feed control member having arms of different lengths whereby the amount of feed of said sticks may be varied.

50. The combination with a machine for linking sausages, of means for feeding sticks into position to receive the linked sausages, a plate over which the linked sausages pass when discharged from the machine, rods projecting through said plate, arms secured on said rods behind said plate, adjustable means connecting said arms, pendulum members secured to said rods adjacent the outer surface of said plate, a fulcrumed lever, an adjustable member connecting one end of said lever to one of said arms, a roller on the other end of said lever, and a cam engaged with said roller to cause said pendulum members to swing back and forth across said plate to loop the linked sausages on said sticks.

51. The combination with a machine for linking sausages, of a stick holding magazine, a stick guide channel below the magazine to receive sticks therefrom, boxes slidable on said guide channel, bell-crank gripping claws pivoted on said boxes, bars connecting said boxes, arms positioned on opposite sides of the guide channel between said boxes, pins on said arms engaging the gripping claws on one of said boxes, a member supported by said arms, an actuating bar connected to said member, and means for reciprocating said actuating bar to cause the gripping claws to engage the sticks and advance the same along the guide channel into position to receive the linked sausages.

52. The combination with a machine for linking sausages of a stick magazine, a stick guide channel therebelow, boxes slidable on the guide channel, gripping claws on said boxes, bars connecting said boxes and engaging the gripping claws on one of said boxes, arms connected with the claws on the other box, a member pivoted between said arms, an actuating bar pivoted to said member, means for reciprocating said actuating bar to cause the gripping claws to engage the sticks and advance the same along the guide channel into position to receive the linked sausages, weighted means for normally ho'ding said pivoted member from rotating, a switch control mechanism for the machine, a stop on one of said boxes, and a gravity acting member pivoted on said magazine and contro'led by the sticks in the magazine, said gravity acting member adapted to engage behind said box stop when the last stick is advanced to cause the pivoted member to rotate whereby the weighted means swings upwardly to actuate the switch control mechanism to stop the machine.

53. The combination with a machine for linking sausages, of means for guiding sticks into the machine, and gravity acting means controlled by the sticks for automatically stopping the machine when the supply of sticks is exhausted.

54. The combination with a sausage linking machine, of a movable sausage casing carrier, and a feed drum adapted to first pull a stuffed casing upwardly over itself and then push the sausage casing into the conveyor faster than the conveyor moves to cause slack in the casing to permit constriction thereof.

55. The combination with a machine for automatically linking sausages, of a gravity acting pivoted member controlled by sticks fed into the machine for automatically stopping the machine when the supply of sticks is exhausted.

56. The combination with a twisting machine, of means for receiving the twisted articles, and a mechanism controlled by said means for automatically stopping the machine.

57. The combination with a machine for linking sausages, of an endless moving mechanism, and means thereon for holding the sausages against untwisting as they approach discharge position.

58. The combination with a sausage linking machine, of rotatable means for engaging the sausages, to hold the same against untwisting as the sausages approach discharge position.

59. In a sausage linking machine the combination with a sausage conveyor, of stationary and rotatable sausage holders supported thereon, and rotatable means for cleaning the sausage holder.

60. The combination with a sausage linking machine, of a magazine supported thereon for holding sticks, and audible signal mechanisms on the machine controlled by the sticks.

61. The combination with a sausage linking machine, of a magazine for holding sticks, audible signal mechanisms held in release position by said sticks and adapted to be released when the supply of sticks drops below a predetermined number, and means for operating the audible signal mechanisms when released.

62. The combination with a twisting machine, of a motor for driving the same, a switch controlling said motor, means for receiving the twisted articles, and mechanisms governed by said means for controlling the operation of said switch.

63. In a sausage linking machine a movable endless conveyor provided with rotatable and stationary sausage holders.

64. In a sausage linking machine a movable conveyor, stationary and rotatable sausage holders alternately arranged on said conveyor, and means for rotating the rotatable sausage holders.

65. The combination with a machine for linking sausages, of means for feeding sticks into position to receive the linked sausages, a signal mechanism, a machine control mechanism, and means controlled by the sticks for governing the time of operation of said signal mechanism and said control mechanism.

66. The combination with a machine for linking sausages, of means adapted to press against the twisted portions of the sausages to hold the same against untwisting.

67. The combination with a machine for linking sausages, of means adapted to press against the twisted portions of the sausages to hold the same against untwisting, and slidable members advanced by the machine for receiving the linked sausages.

68. In a sausage linking machine a conveyor provided with rotatable and stationary sausage holders, sausage clamping members supported on said holders, constricting means on said conveyor between said holders, radial means on said rotatable holders to permit rotation thereof to cause twisting of a sausage casing to form linked sausages.

69. The combination with a sausage casing conveyor, of means thereon for constricting the sausage casing at intervals, and means on said conveyor for twisting the contricted portions of said casing.

70. The combination with a sausage casing conveyor, of means thereon for constricting a sausage casing at intervals, means on said conveyor for twisting the contricted portions of said casing, and means for engaging the twisted portions to hold the same against untwisting.

In testimony whereof I have hereunto subscribed my name in the presence of two subscribing witnesses.

WALTER J. O. JOHNSON.

Witnesses:
FRED E. PESLER,
JAMES M. O'BRIEN.